(No Model.) 3 Sheets—Sheet 1.
G. H. PATULLO.
SAWMILL CARRIAGE.
No. 568,272. Patented Sept. 22, 1896.
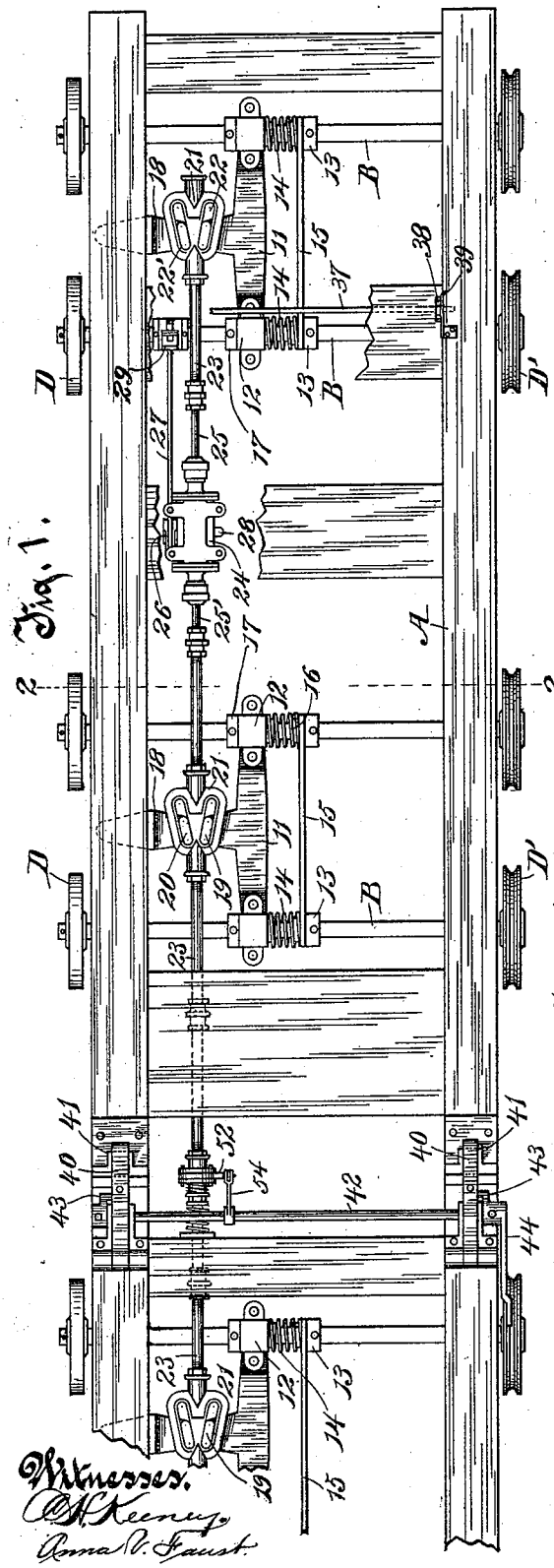
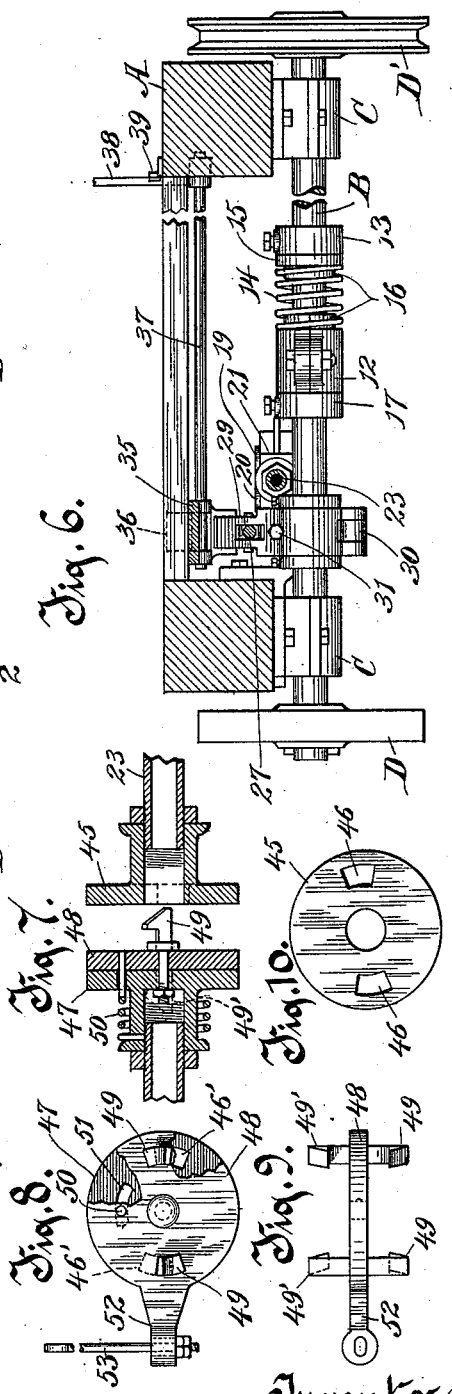
Witnesses.
O. H. Keeney
Anna V. Faust
Inventor.
George H. Patullo
By Benedict & Morsell
Attorneys.

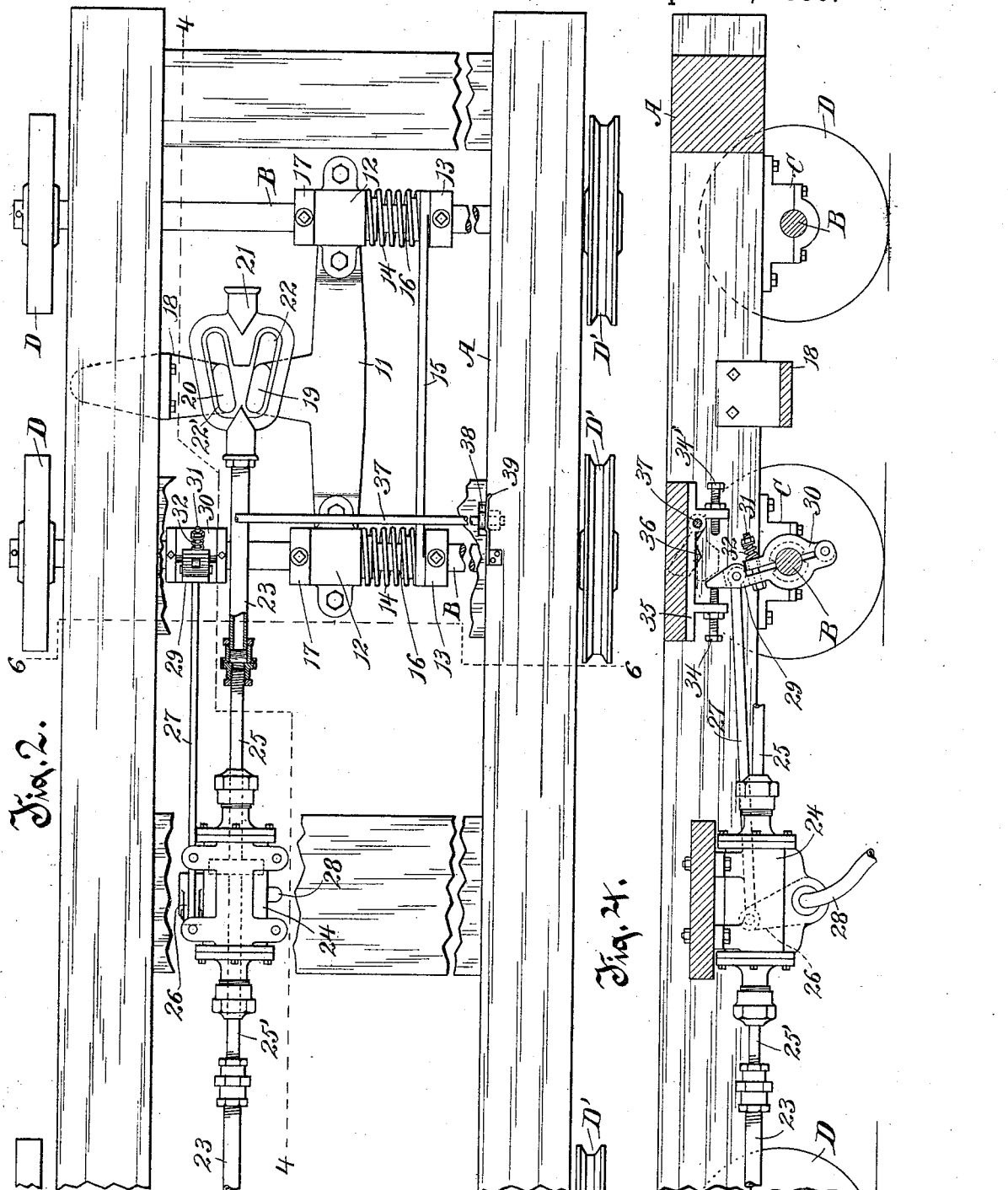

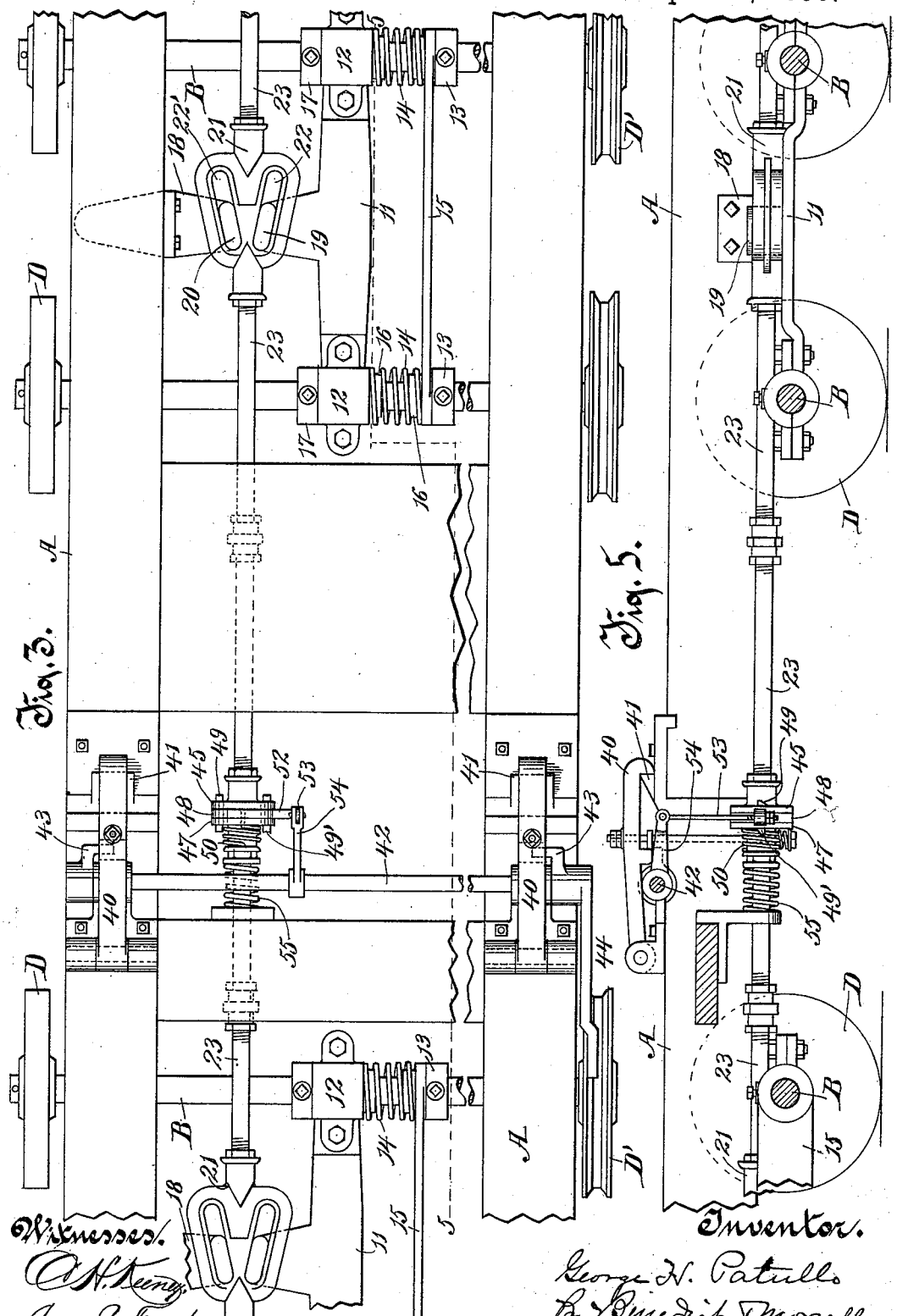

UNITED STATES PATENT OFFICE.

GEORGE H. PATULLO, OF BAY CITY, MICHIGAN.

SAWMILL-CARRIAGE.

SPECIFICATION forming part of Letters Patent No. 568,272, dated September 22, 1896.

Application filed March 1, 1895. Serial No. 540,230. (No model.)

*To all whom it may concern:*

Be it known that I, GEORGE H. PATULLO, of Bay City, in the county of Bay and State of Michigan, have invented a new and useful Improvement in Sawmill-Carriages, of which the following is a description, reference being had to the accompanying drawings, which are a part of this specification.

In that class of sawmill-carriages that reciprocate, carrying the log or timber forward and back past the saw at the side thereof, it is desirable, after the saw has cut through the log under the forward movement of the carriage and as the carriage begins to run back, to move it and the log thereon laterally a little away from the saw, so that while the carriage is running back there will be no danger of any contact or engagement of the saw with the log during such return movement of the carriage and log.

The object of my invention is, first, to provide improved means for offsetting or moving the carriage laterally on its trucks or axles; second, to provide means for actuating the offsetting mechanism, especially means on the carriage and connected therewith, in and by which steam, compressed air, or water under pressure can be used for operating the offsetting mechanism, and, third, to provide devices for coupling together two or more carriages having means for offsetting them.

In the drawings, Figure 1 is a top plan view of a sawmill-carriage with the mechanism of my invention attached thereto (parts of the carriage being broken away for better exhibition of the mechanism) and a fragment of a second carriage connected with the first carriage, showing appliances for connecting the carriages and my improved mechanism together. Fig. 2 is an enlarged plan view of that portion of the carriage and mechanism that is shown at the right of the line 2 2 on Fig. 1. Fig. 3 is an enlarged plan view of fragments of the carriages and the mechanism thereof shown at the left of the line 2 2 in Fig. 1, parts of the construction in Figs. 2 and 3 being broken away and omitted for convenience of illustration. Fig. 4 is a longitudinal vertical section of the fragment of a carriage shown in Fig. 2, exhibiting features of mechanism also mostly found in Fig. 2, the section being on line 4 4 of Fig. 2. Fig. 5 is a longitudinal vertical section of a fragment of the carriage and mechanism thereon, the view being on line 5 5 of Fig. 3. Fig. 6 is a transverse vertical section of the carriage and mechanism on line 6 6 of Fig. 2, looking toward the right. Figs. 7, 8, 9, and 10 exhibit details of devices for coupling together the offset mechanism at the ends of two abutting carriages.

In the drawings, A is the frame, constituting substantially the carriage. The frame or carriage is provided with a plurality of axles B, journaled and movable endwise in boxes C, fixed on the carriage. The axles are provided with wheels D D', fixed thereto, which wheels are adapted to travel on the ways or tracks provided therefor, the wheels at one end of the axles at least being grooved or flanged to retain them properly on the track against lateral movement. The carriage is a little narrower than the distance between the wheels on the same axle. By this construction the carriage is adapted to be reciprocated endwise on its track, the track and means for reciprocating it not being shown, as they are well known and form no part of my invention. The construction also provides for a slight movement of the carriage laterally on the axles, thereby permitting of the offsetting of the carriage from the saw, to which function my invention chiefly relates.

For accomplishing the offsetting of the carriage, plates or blocks 11 are suitably attached each to one or more of the axles of the carriage, conveniently by boxes 12 12, secured to the plates 11, which boxes encircle the axles, permitting revoluble motion thereof therein, while the plates have a permissible motion thereon endwise thereof. At a little distance to the rear of the plates 11 collars 13 13 are secured adjustably to the axles B B, and springs 14 14 are interposed between the collars 13 and the boxes 12 on the plates 11, whereby the plates are adjusted and held yieldingly to their work. A bearing-plate or washer 15 is interposed between the collars 13 and the springs 14. The washer 15 and the boxes 12 are each preferably provided with annular flanges 16, adapted to enter the central longitudinal bores of the springs 14 and support the springs thereon, whereby the springs are maintained out of contact with the axles about which they are coiled. Collars 17, secured adjustably to the axles in front of the boxes 12, prevent the undue movement of the plates 11 in that direction. The strength of the springs 14 is such as normally to hold the plates 11 up to their work constantly, but are adapted to yield under great abnormal strain, so as thereby to prevent the breaking of the parts. In front of the plates 11 and opposite thereto other blocks or plates 18 are secured rigidly to the carriage A. The plates 11 and 18 are respectively provided with upturned bearing members 19 and 20. These bearing members 19 and 20 are located opposite each other and at a little distance apart, and are preferably elongated longitudinally of the carriage, so as to provide more extended bearing-surfaces, which bearing-surfaces are inclined toward each other in one direction, separating from each other in the opposite direction, or, in other words, are oblique in reverse directions to the longitudinal axis of the carriage. It will be noticed that there are two sets of these plates 11 and 18 attached to each carriage, one near one end and the other near the other end thereof. Two sets on each carriage are required, in order that the carriage may be moved concurrently and equally laterally throughout its length. Additional sets of these plates and mechanism coacting therewith may be used, if desired, on each carriage. With each set of these plates a movable push-block 21 is required. Each of these push-blocks has two slots 22 22' arranged adjacent and opposite to each other and disposed reversely inclined toward each other or oblique to the longer axis of the carriage in which the bearing-blocks 19 and 20 respectively fit movably, whereby by the movement of the push-blocks past the bearing-blocks in one direction the bearing-blocks are separated and the carriage is correspondingly moved laterally on the axles, and by the movement of the push-blocks in the other direction the bearing-blocks are correspondingly drawn toward each other and the carriage shifted laterally on the axles. Connecting-rods 23, secured to the push-blocks, connect them to each other or to operating devices. These rods 23 are conveniently constructed of gas-pipe and are coupled to each other or to the valve-stems, hereinafter to be described, by any suitable known devices.

It is desirable that the offsetting mechanism hereinbefore described be actuated directly either by steam, compressed air, or water under pressure, and for this purpose I provide other mechanism adapted therefor, substantially as follows: A cylinder 24 with a reciprocable piston therein is permanently secured to the carriage A, preferably between and in the line of two of the push-blocks 21. The piston is provided with stems 25 25', extending in opposite directions therefrom, which stems are respectively connected to the adjacent rods 23. This cylinder is steam or air tight, being adapted for the use therewith of steam, compressed air, or water under pressure, and is provided with inlet and outlet ports in such form and of such character as is common for use with steam-cylinders, the ports being preferably provided with rotary cut-off valves on the same axis or shaft, such valve-shaft being provided with a crank-arm 26, to which an actuating-rod 27 is connected. The actuating medium (steam, compressed air, or water) is supplied to the cylinder, preferably through the valve-shaft, by means of the flexible hose 28, connected therewith, or by other suitable and known means. The cut-off valve is operated automatically through the rod 27 by means of the lever-arm 29, mounted on and projecting radially from an axle B, to which arm the rod 27 is connected. This lever-arm 29 partially encircles an axle and is provided with a jaw 30, pivoted at one extremity to the arm, and, extending opposite to the arm around the axle on the other side thereof, is at its other extremity secured to the arm, and with the arm is clamped to the axle by means of a bolt 31, passing through the arm and through the jaw. A spring 32 about the bolt 31, interposed between the nut thereon and the jaw, holds the jaw and lever to the axle yieldingly. Segmental removable brasses or bushings 33 of suitable material (indicated by dotted lines) are placed in the arm and jaw to bear against the axle. By means of the jaw, the bolt, and the spring the lever or crank-arm 29 is so clamped to the axle as to be held yieldingly revolubly thereto, whereby when the carriage is started toward the left, Fig. 4, by the means employed for reciprocating the carriage on its track, the arm 29 is shifted to the position seen in Fig. 4, and thereby steam is admitted to the cylinder 24 on that side of the piston that moves it toward the left, correspondingly moving the push-blocks also to the left, separating the bearing-blocks 19 and 20, thereby offsetting the carriage from the saw, which is the movement required and result desired at the beginning of the return travel of the carriage. As soon as the arm 29 is by the revolution of the axle tilted to the left sufficiently far to open the steam-valve the movement of the lever in that direction is stopped by contact with the set-screw 34, and thereafter the axle rotates in the bearing in the arm. When the carriage has reached the limit of its travel to the left and is started forwardly toward the right, the rotation of the axle in the other direction tilts the lever-arm 29 forwardly toward and against the set-screw 34', thereby oscillating the steam-valve and admitting steam to the other side of the piston, whereby the push-blocks are moved in the other direction and the carriage is moved laterally toward the saw, putting the log in front of the saw to be sawed thereby as the carriage moves endwise past it. The set-screws 34 34' are mounted adjustably toward each other in a bracket 35, fixed on the carriage-frame. The set-screws are adapted to limit the oscillation of the lever-arm 29.

It is sometimes desirable to run the carriage forward or backward longitudinally, without shifting it laterally, as, for instance, when a saw-cut has been partially made, and it is desired to withdraw the log without completing the cut, and to prevent the automatic shifting of the carriage; in such cases I provide a tampion or dog 36, adapted to be inserted between the arm 29 and the set-screw 34 or 34', whereby the tilting of the arm is prevented. This tampion is secured to and projects radially from a rock-shaft 37, journaled on the carriage, which rock-shaft is provided with a lever-handle 38, by which the attendant may throw down or release the tampion or dog from its work. A spring 39, fixed on the carriage, bears against the lever-handle 38 and locks the rock-shaft 37 yieldingly in position.

It sometimes occurs that for cutting up long logs it is necessary to couple two carriages together end to end. For this purpose devices are now in use consisting, substantially, of swinging latches 40, pivoted on one carriage near its extremity, said latches being adapted to engage catches provided therefor on the end of the other carriage. For conveniently lifting these latches and thereby uncoupling the carriages a rock-shaft 42 is used, which rock-shaft is journaled on the carriage and is provided with crank-latch-lifting arms 43, adapted to engage and lift the latches, and with an actuating-lever handle 44 for oscillating the shaft.

In connection with such carriage-coupling devices I provide means for coupling and uncoupling the connecting-rods 23, that connect and actuate the push-blocks 21 of my offsetting mechanism. In these coupling devices a disk head 45 is secured to the end of one of the rods 23, the face of the disk head being substantially flush with the end of the carriage. This disk head is provided with segmental slots 46, preferably two, and permissibly more. On the extremity of the rod 23 on the other car and opposite to the disk head 45 I provide a disk head 47, secured to the rod. A corresponding disk 48, pivoted centrally to the disk 47, and thereby swiveled thereon, is provided with catches 49, projecting therefrom, opposite to and adapted to enter the slots 46 when the disk head 45 is brought thereto and to engage that disk by the oscillation or revoluble movement of the disk 48. A torsional spring 50 is coiled around the hub or shank of the disk head 47, the rear extremity of the spring being secured against revolution to the rear end of the shank of the head and the forward end of the spring extending through a segmental slot 51 therefor in the head 57 and being fixed in the disk 48. The action of the spring holds the catches 49 yieldingly up to position to engage the head 45. The front extremities of the catches 49 are beveled off, so that as they are thrown against the end walls of the slots 46 they will be pushed back therefrom by the incline and will pass through the slots and engage the disk head.

Catches 49', like the catches 49, are provided opposite thereto on the other side of the disk 48, which project therefrom into corresponding segmental slots 46' in the head 47, these latter catches 49' being adapted to engage the head 47 and couple it through the catches 49 to the head 45 by means of the torsional action of the disk 48, on which the catches respectively are carried and guided. The disk 48 is provided with a radially-projecting shank 52, which is connected by a rod 53 to a crank-arm 54 on the rock-shaft 42. It will be understood that by this means the oscillation of the shaft 42 that lifts the latches 40 and uncouples the carriages also oscillates the disk 48 and uncouples the catches 49 from the head 45. An extensible spring 55, coiled about the rod 23 and bearing at one extremity against a collar on the rod and at the other extremity against a rail of the carriage, is adapted to bring and hold the disk head 47 yieldingly up to position, substantially flush with the end of the carriage-frame, so that the parts will certainly automatically couple up when the carriages are brought together. Without this spring 55 the rod 23, with the bearing-blocks 21 connected directly therewith, might be left at some other point of its travel in the carriage, which would leave the disk head 47 away from the end of the carriage, whereby it would not come to and couple with the head 45 when the carriages were brought together.

The rods 23 are sufficiently elastic to permit of a slight lateral movement of the push-blocks 21 on the carriage with reference to the thereto permanently-fixed cylinder 24.

What I claim as my invention, and desire to secure by Letters Patent, is—

1. In a sawmill-carriage, the combination with the carriage-axles, and the carriage-frame mounted and movable laterally on the axles, of bearing-blocks secured in sets opposite each other respectively to the axles and to the carriage-frame against normal movement laterally on the members to which they are respectively secured, and a push-block movable longitudinally of the carriage having an inclined surface or surfaces oblique to the longer axis of the carriage bearing against said blocks, said push-blocks being adapted by being moved horizontally past the bearing-blocks to shift the carriage laterally on the axles, substantially as described.

2. In a sawmill-carriage, the combination with the carriage-axles, and the carriage-frame mounted and movable laterally on the axles, of bearing-blocks secured in sets opposite each other respectively to the axles and to the carriage-frame against normal movement laterally on the members to which they are respectively secured, and a push-block movable longitudinally of the carriage provided with elongated inclined slots therein, reversely oblique to the longer axis of the carriage in which said bearing-blocks are fitted movably, substantially as described.

3. In offsetting mechanism for a sawmill-carriage, the combination with the carriage-axles and the carriage-frame mounted and movable laterally thereon, of a block on the carriage, a complementary block opposite thereto mounted movably on the axles, a movable push-block connecting the block on the carriage adjustably with the block on the axles, collars fixed on the axles, and springs interposed between said blocks movable on the axles and said collars whereby under abnormal strain said movable blocks are permitted to yield laterally, substantially as described.

4. In a sawmill-carriage, the combination with the carriage-axles, and the carriage-frame mounted and movable laterally on the axles, of a plurality of sets of bearing-blocks secured in sets opposite each other respectively to the axles and to the carriage-frame against normal movement laterally thereon, push-blocks movable longitudinally of the carriage provided with cams adapted as the push-blocks are moved in the direction of the longer axis of the carriage past the bearing-blocks to separate them and thereby to move the carriage-frame laterally on the axles, and means connecting the push-blocks together and to an actuating device adapted to reciprocate the push-blocks endwise of the carriage, substantially as described.

5. The combination in a sawmill-carriage, of a frame mounted and movable laterally on axles, oppositely-disposed bearing-blocks on the frame and the axles respectively, thrust-blocks bearing against the bearing-blocks and adapted by the movement of the blocks past the bearing-blocks in the direction of the reciprocation of the carriage to shift the frame laterally on the axles, a steam-cylinder on the frame in line with two or more thrust-blocks, and rods connecting the thrust-blocks directly to the piston of the cylinder on both sides thereof, substantially as described.

6. In a sawmill-carriage, the combination with a cylinder, having a traveling actuating-piston and a valve, and a valve-shifting oscillating arm mounted frictionally rotatively with and releasably on an axle of the carriage, and stops on the frame adapted to limit the oscillation of the arm, of a tampion or dog on a rock-shaft journaled in the frame capable of being interposed between the oscillating arm and a stop and thereby preventing the oscillation of the arm, substantially as described.

7. The combination with a plurality of offsetting sawmill-carriage frames, and means for coupling them together, of offsetting devices and means for coupling them together, substantially as described.

8. The combination with a plurality of offsetting sawmill-carriage frames, of reciprocative devices for operating the offsetting mechanism, complementary terminal coupling devices on the respective frames adapted when brought together to couple up said offsetting devices, and a spring adapted to hold a member of said offset-actuating devices up to its work, substantially as described.

9. In offset mechanism for sawmill-carriages, a coupling device comprising complementary heads having segmental slots, an interposed disk swiveled to one of the heads, catches on the swiveled disk adapted to enter the slots and engage the heads, and a torsional spring adapted to hold the catches on the disk yieldingly up to their work, substantially as described.

In testimony whereof I affix my signature in presence of two witnesses.

GEORGE H. PATULLO.

Witnesses:
C. T. BENEDICT,
ANNA V. FAUST.